3,074,991
Patented Jan. 22, 1963

3,074,991
DITHIOPHOSPHONIC ACID ESTERS AND A PROCESS FOR THEIR PRODUCTION
Gerhard Schrader, Wuppertal-Cronenberg, Germany, assignor to Farbenfabriken Bayer Aktiengesellschaft, Leverkusen, Germany, a corporation of Germany
No Drawing. Filed July 13, 1959, Ser. No. 826,453
Claims priority, application Germany July 29, 1958
8 Claims. (Cl. 260—461)

The present invention relates to and has as its objects new and useful dithiophosphoric acid esters and a process for their production. The new compounds, which exhibit a remarkable insecticidal action, may be represented by the following general formula

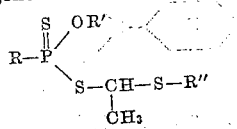

in which R stands for a lower alkyl, cyclo alkyl or lower alkenyl group, R' and R" stand for lower alkyl groups.

Dithiophosphonic acid esters in which a thiol sulfur is esterified by an alkyl mercapto alkyl group are already known from the literature and the object of various prior patent specifications. However, no such dithio phosphonic acid esters have been described in which at the thiol sulfur as ester group an alkyl mercapto methyl group is found which is additionally substituted at the methyl group by a further methyl radical.

These compounds which are the object of the present invention are obtained by reaction of corresponding dithiophosphonic acid-O-alkyl esters with alkyl-vinyl-thioethers.

This reaction is to be seen from the following equation using methyl thiono-thiolphosphonic acid-O-methyl ester and methyl vinyl ether as reactants:

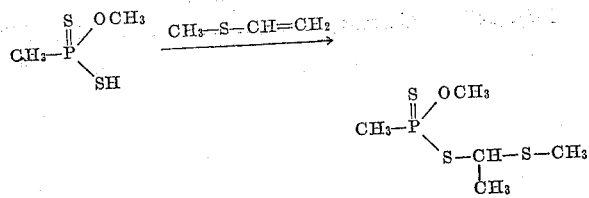

The addition of the vinyl-alkyl thioethers to the free dithiophosphonic acids takes place expediently in the presence of suitable inert solvents such as for example benzene, toluene or the like.

The new compounds are highly active insecticidal materials. They distinguish themselves particularly by a simultaneous action against eating insects (caterpillars). They are applied in the ways usual for other phosphorus insecticides, i.e. preferably in combination with suitable solid or liquid extending or diluting agents, optionally in an association with suitable commercially used emulsifiers.

As an example for the special utility of the inventive compounds the compounds of the following formula

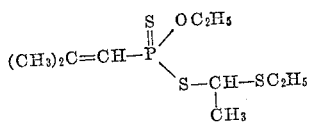

has been tested against caterpillars. Aqueous solutions of the aforesaid compound have been prepared by admixing it with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The test has been carried out as follows:

Against caterpillars of the type diamond black moth (Plutella maculipennis): white cabbage has been sprayed drip wet with aqueous emulsions as prepared above in a concentration as shown below. Caterpillars (10 each) have been placed on the sprayed leaves of the white cabbage. The living status of the caterpillars has been determined after 24 hours and 48 hours. The following results have been obtained: 0.1% solutions killed caterpillars completely, 0.01% solutions killed caterpillars to 95%.

The following examples are given to illustrate the process of the present invention.

Example 1

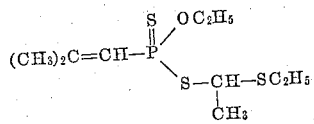

49 grams (0.25 mol) of isobutenyl thionophosphonic-ethyl ester-thiol acid are dissolved in 100 ml. of benzene. With stirring there are added dropwise 2 grams (0.25 mol) of ethyl vinyl ethyl ester. The temperature rises to about 65° C. Stirring is continued for 2 hours and the reaction product is then poured into water. The separated oil is taken up in benzene, washed neutral, and dried over sodium sulfate. By fractionation 39 grams of the new ester with boiling point 97° C./0.01 mm. Hg are obtained. Yield 55% of the theoretical.

On rats per os the ester shows a medium toxicity of 25 mg./kg.

By the same way but using instead of isobutenyl thionophosphonic ethyl ester-thiol acid the corresponding equimolecular amount of vinyl thionophosphonic ethyl ester-thiol acid there is obtained the compounds of the following formula

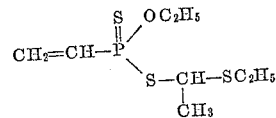

Example 2

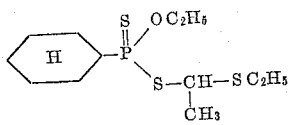

22 grams (0.25 mol.) of vinyl-thioethyl-ether are dissolved in 50 ml. of benzene. With stirring there are added to this solution 56 grams (0.25 mol) of cyclohexyl-thionophosphonic acid ethyl ester-thiolic acid. The temperature rises to 50° C. It is held at 50° C. for a further 2 hours and the reaction product is then poured into water. The precipitated oil is taken up with benzene, washed neutral with water, dried and held for a short time at a bath temperature of 70° C. under a pressure of 0.01 mm. In this way there are obtained 50 grams of the new ester as a pale yellow water-insoluble oil. Yield 64% of the theoretical.

By the same way but using instead of vinyl-thioethyl ether the corresponding molecular amount of vinyl-thiomethyl- or -isopropyl-ether there are obtained the following compounds

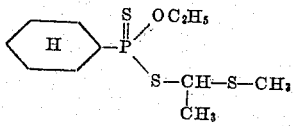

or

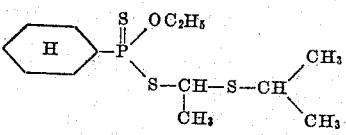

*Example 3*

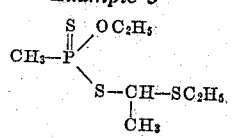

39 grams (0.25 mol) of methylthiono-O-ethyl-thiolphosphonic acid are dissolved in 50 ml. of benzene. With stirring 22 grams of (0.25 mol) of ethyl-vinylthioether are added. The mixture is stirred for another hour at a temperature of 60° C. and then allowed to cool. The reaction product is washed in water. The benzene solution is separated and washed neutral with water. After drying over sodium sulfate it is fractionated. 50 grams of the above compound are obtained of boiling point 78° C./0.01 mm. Hg. Yield 82% of the theoretical.

By the same way but using instead of methylthiono-O-ethyl-thiolphosphonic acid the corresponding equimolecular amount of ethyl-thiono-O-methyl-thiolphosphonic acid there is obtained the following compound

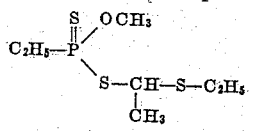

I claim:
1. A dithiophosphonic acid ester of the following general formula

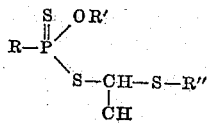

in which R stands for a member selected from the group consisting of cyclo alkyl and lower alkenyl, R' and R'' stand for lower alkyl groups.
2. A compound of claim 1 wherein R is cyclo alkyl.
3. A compound of claim 1 wherein R is lower alkenyl.
4. The compound of the following formula

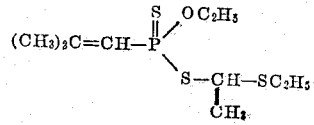

5. The compound of the following formula

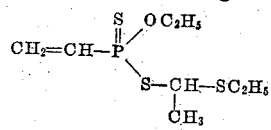

6. The compound of the following formula

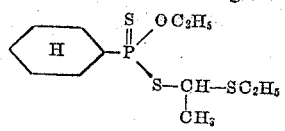

7. The compound of the following formula

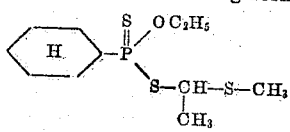

8. The compound of the following formula

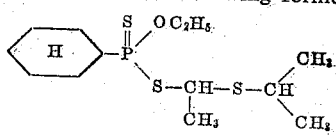

References Cited in the file of this patent
UNITED STATES PATENTS

| | | |
|---|---|---|
| 2,881,201 | Schrader | Apr. 7, 1959 |
| 2,918,488 | Schrader | Dec. 22, 1959 |

FOREIGN PATENTS

| | | |
|---|---|---|
| 1,032,247 | Germany | June 19, 1958 |

UNITED STATES PATENT OFFICE

CERTIFICATE OF CORRECTION

Patent No. 3,074,991                                                        January 22, 1963

Gerhard Schrader

It is hereby certified that error appears in the above numbered patent requiring correction and that the said Letters Patent should read as corrected below.

Column 1, line 38, for "ether" read -- thioether --; column 2, line 30, for "2 grams" read -- 22 grams --; line 31, for "ethyl ester" read -- thioether --; column 3, last line in the structural formula of claim 1, for $$\underset{\mathrm{CH}}{|} \quad \text{read} \quad \underset{\mathrm{CH_3}}{|}$$

Signed and sealed this 19th day of November 1963.

(SEAL)
Attest:

ERNEST W. SWIDER
Attesting Officer

EDWIN L. REYNOLDS

Acting Commissioner of Patents